(12) United States Patent
Wang et al.

(10) Patent No.: US 8,247,690 B2
(45) Date of Patent: Aug. 21, 2012

(54) HOUSING FOR ELECTRONIC DEVICE

(75) Inventors: Wei-Jun Wang, Shenzhen (CN);
Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 497 days.

(21) Appl. No.: 12/512,046

(22) Filed: Jul. 30, 2009

(65) Prior Publication Data
US 2010/0270050 A1    Oct. 28, 2010

(30) Foreign Application Priority Data

Apr. 27, 2009    (CN) .......................... 2009 1 0301885

(51) Int. Cl.
*H05K 5/00* (2006.01)
(52) U.S. Cl. ..................... 174/50; 174/520; 361/679.02; 361/679.01; 312/223.2
(58) Field of Classification Search .................... 174/50, 174/520, 66, 67, 17 R; 361/683, 724, 730, 361/752, 796, 679.01, 679.02, 679.59, 725; 312/223.1, 223.2, 223.3, 265.6, 265.5; 220/3.2, 220/3.8, 4.02
See application file for complete search history.

(56) References Cited

U.S. PATENT DOCUMENTS

| | | | |
|---|---|---|---|
| 6,288,333 B1* | 9/2001 | Liu et al. | 312/223.2 |
| 6,373,690 B1* | 4/2002 | Buican et al. | 361/679.59 |
| 6,738,255 B2* | 5/2004 | Chen | 361/679.02 |
| 7,009,845 B2* | 3/2006 | Chen et al. | 312/223.2 |
| 7,253,360 B2* | 8/2007 | Chen et al. | 174/50 |
| 7,377,602 B2* | 5/2008 | Chen et al. | 312/223.2 |
| 7,795,534 B2* | 9/2010 | Lin et al. | 174/66 |

* cited by examiner

*Primary Examiner* — Angel R Estrada
(74) *Attorney, Agent, or Firm* — Altis Law Group, Inc.

(57) ABSTRACT

A housing for an electronic device includes a main body, a cover, and a sliding control. The main body defines a plurality of restricting grooves. The cover has a plurality of engaging members. The sliding control is slidably positioned on the cover, and fixedly to the engaging members. When the sliding control slides relative to the cover, the engaging members engage in the restricting grooves of the main body, thus fixing the cover to the main body.

20 Claims, 7 Drawing Sheets

HOUSING FOR ELECTRONIC DEVICE

BACKGROUND

1. Technical Field

The present disclosure relates generally to device housings and, more particularly, to a housing for an electronic device.

2. Description of Related Art

An electronic device, such as a computer, often has a housing for protecting inner electrical components thereof. The housing includes a main body and a cover. A circuit board and a power supply are assembled in the main body. The cover is fixed on the main body via a plurality of screws. However, when assembling the cover to the main body, the screws must be tightened one by one, consuming time and impacting assembly efficiency of the housing.

In order to solve the described problem, a housing has a connecting mechanism fixing the cover to the main body is needed. The connecting mechanism includes a plurality of hooks formed on the cover, and defines a plurality of engaging grooves in the main body for receiving the hooks. However, when disassembling the connecting mechanism, considerable external force is required on the cover to eject the hooks from the engaging groove. Furthermore, the hooks are easily damaged in the process.

Therefore, a housing which overcomes the described limitations is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
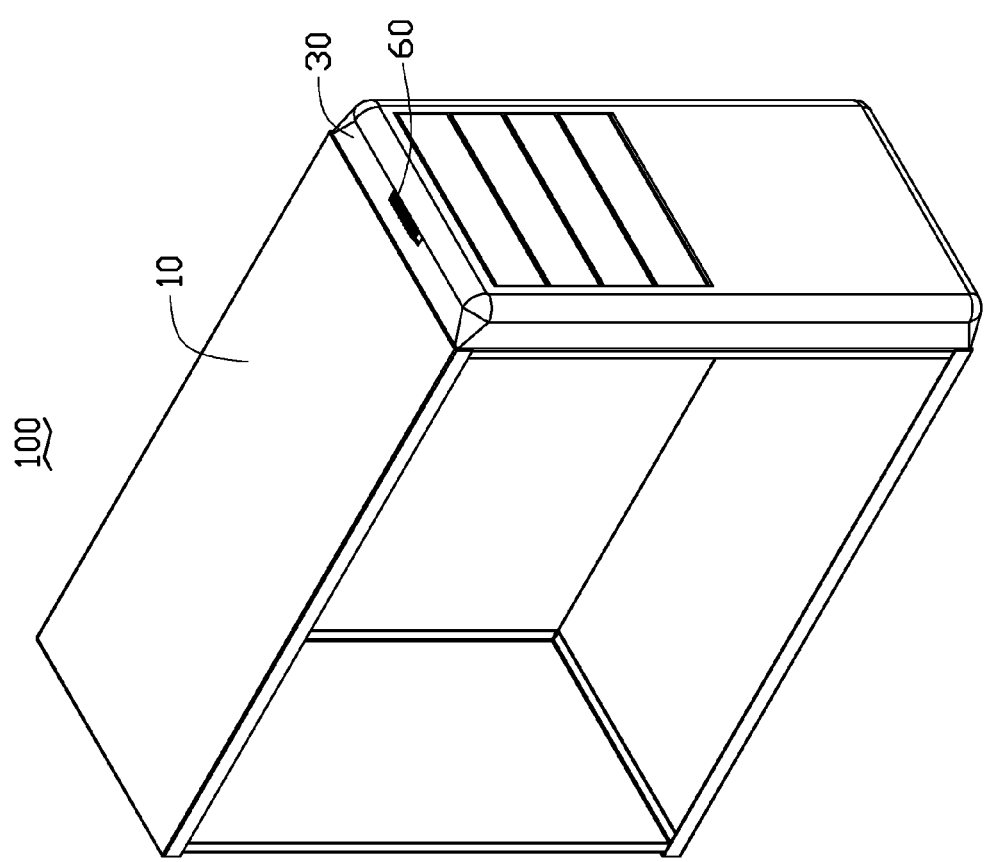
FIG. 1 is an isometric view of an embodiment of a housing for electronic device.
Figure 2:
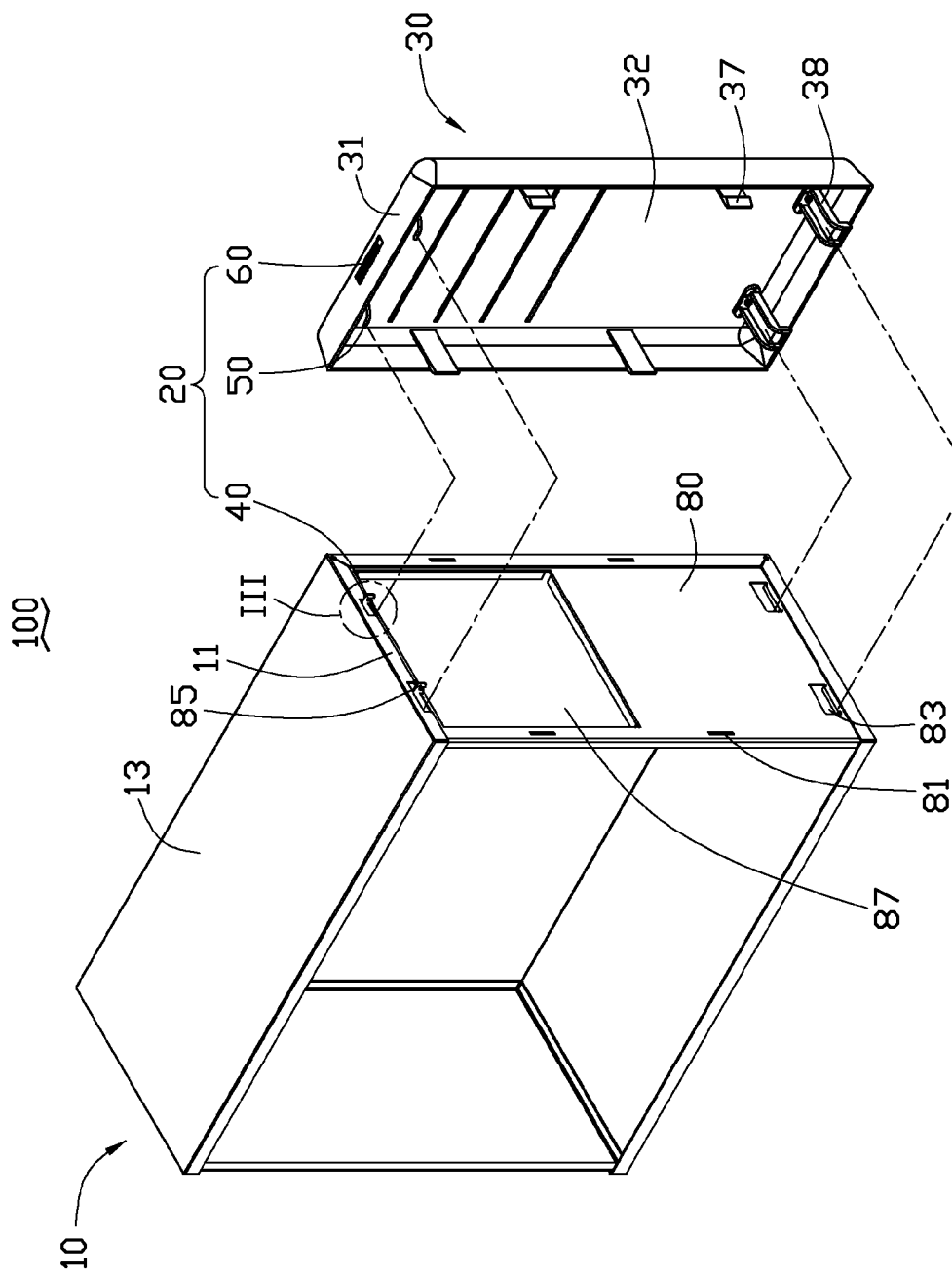
FIG. 2 is a partially exploded, isometric view of the housing of FIG. 1.
Figure 3:
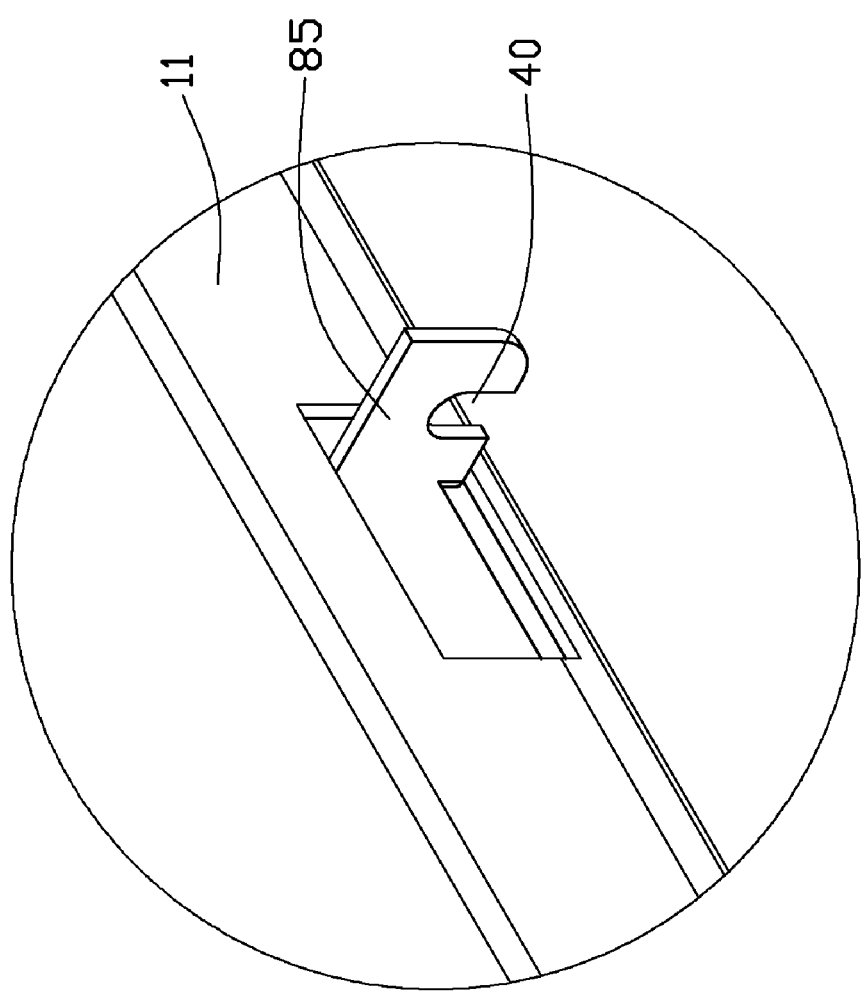
FIG. 3 is an enlarged view of the circled portion III of FIG. 2.

Referring to FIGS. 1 through 3, an embodiment of a housing 100 for an electronic device includes a main body 10, a connecting mechanism 20, and a cover 30 connected to the main body 10 by the connecting mechanism 20. The connecting mechanism 20 includes one or more restricting grooves 40 defined in the main body 10, one or more fastening assemblies 50 and one or more sliding controls 60 positioned on the cover 30. In the illustrated embodiment, the connecting mechanism 20 includes two restricting grooves 40, two fastening assemblies 50, and one sliding control 60.

The main body 10 includes a frame 13 and a connecting plate 80 positioned on a side of the frame 13. In the illustrated embodiment, the connecting plate 80 is substantially rectangular. The connecting plate 80 defines a plurality of positioning holes 81 in opposite sides. One end of the connecting plate 80 defines two connecting holes 83, and the other end of the connecting plate 80 forms two engaging protrusions 85. The restricting grooves 40 are defined in the engaging protrusions 85, and are substantially U-shaped. The connecting plate 80 further defines a through hole 87 for heat dispersal.

Figure 4:
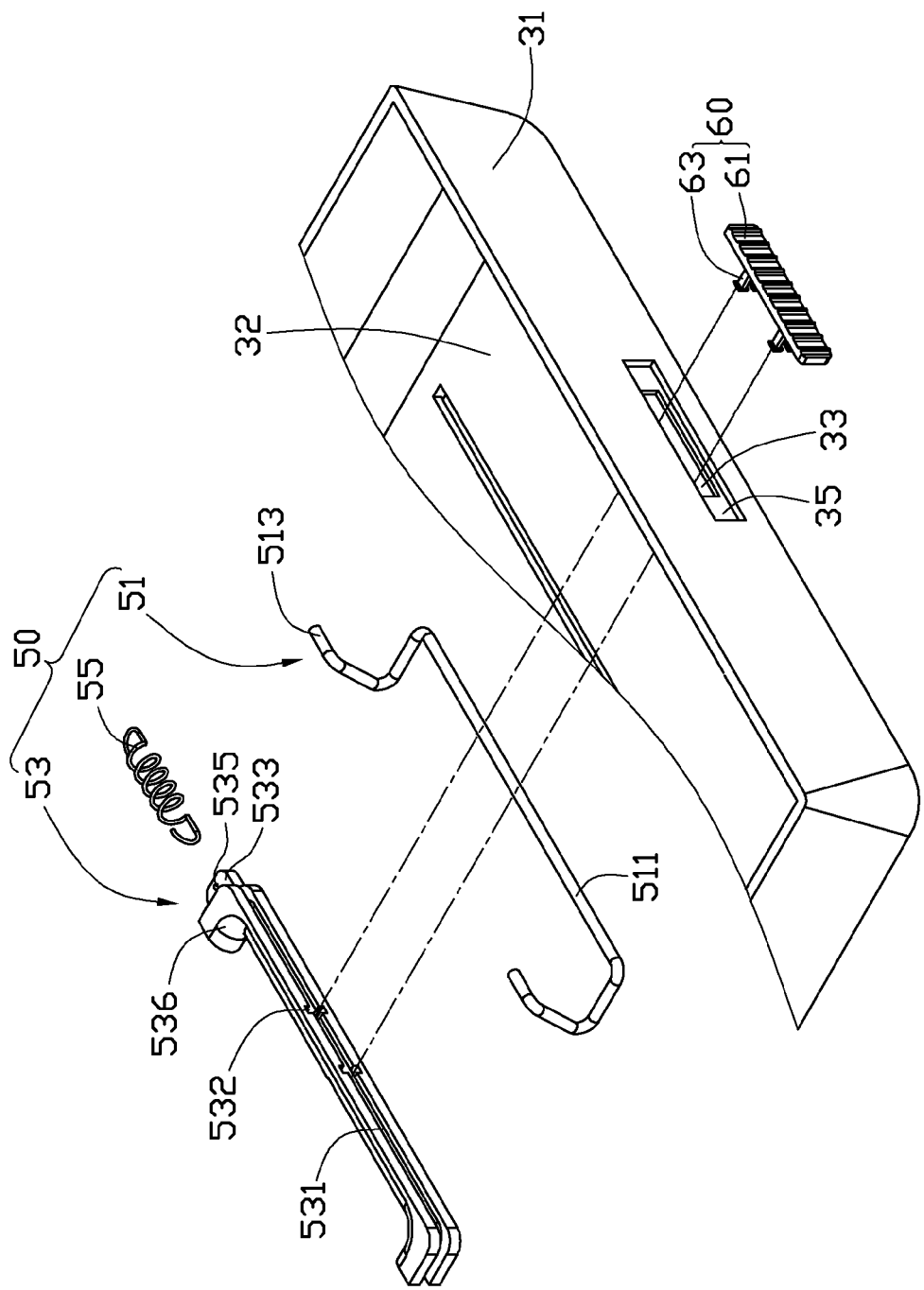
FIG. 4 is an exploded, isometric view of a fastening assembly, a sliding control, and a cover of FIG. 1.
Figure 5:
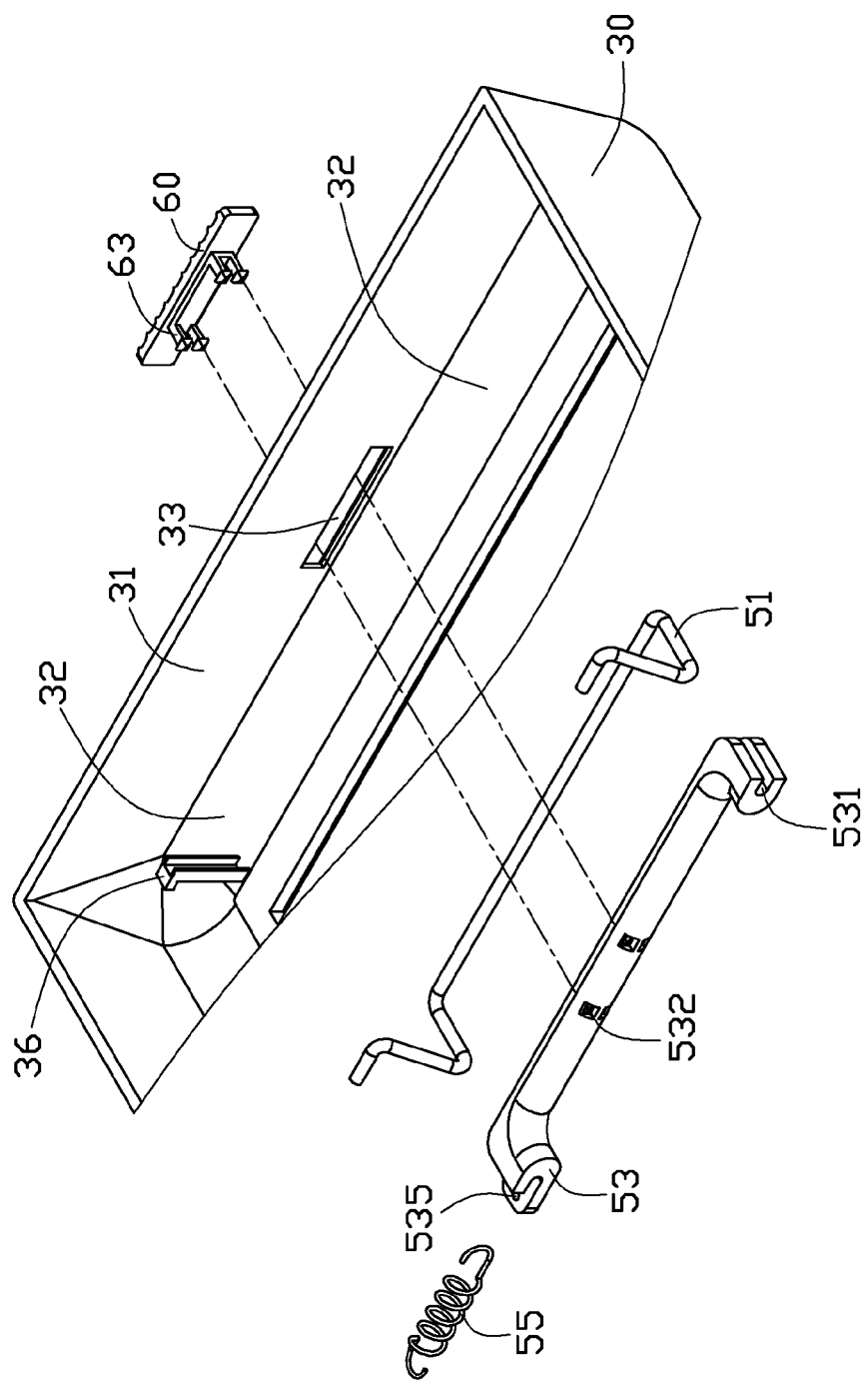
FIG. 5 is similar to FIG. 4, but viewed from another aspect.
Figure 6:
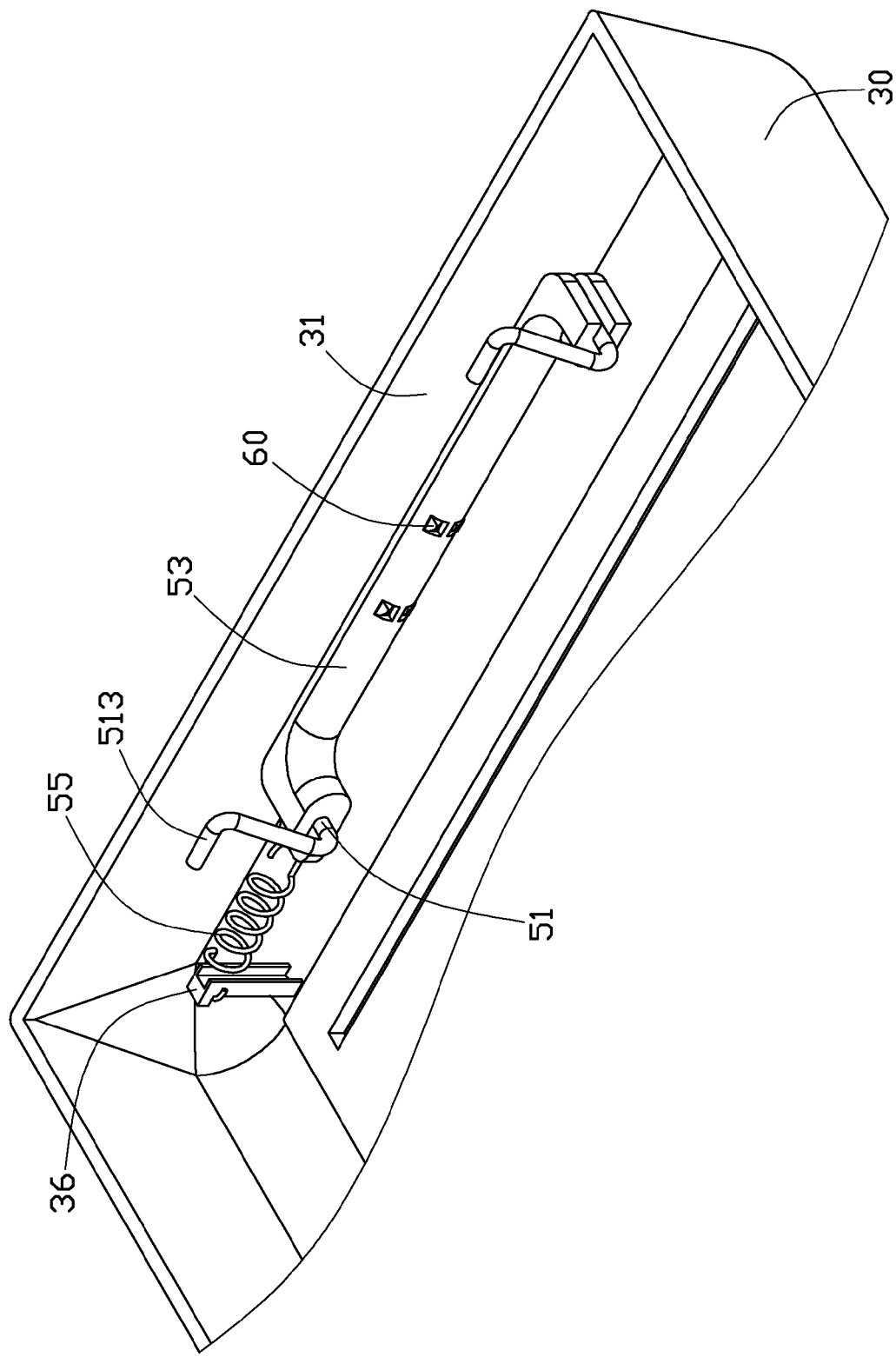
FIG. 6 is an assembled, isometric view of the fastening assembly, the sliding control, and the cover of FIG. 4.
Figure 7:
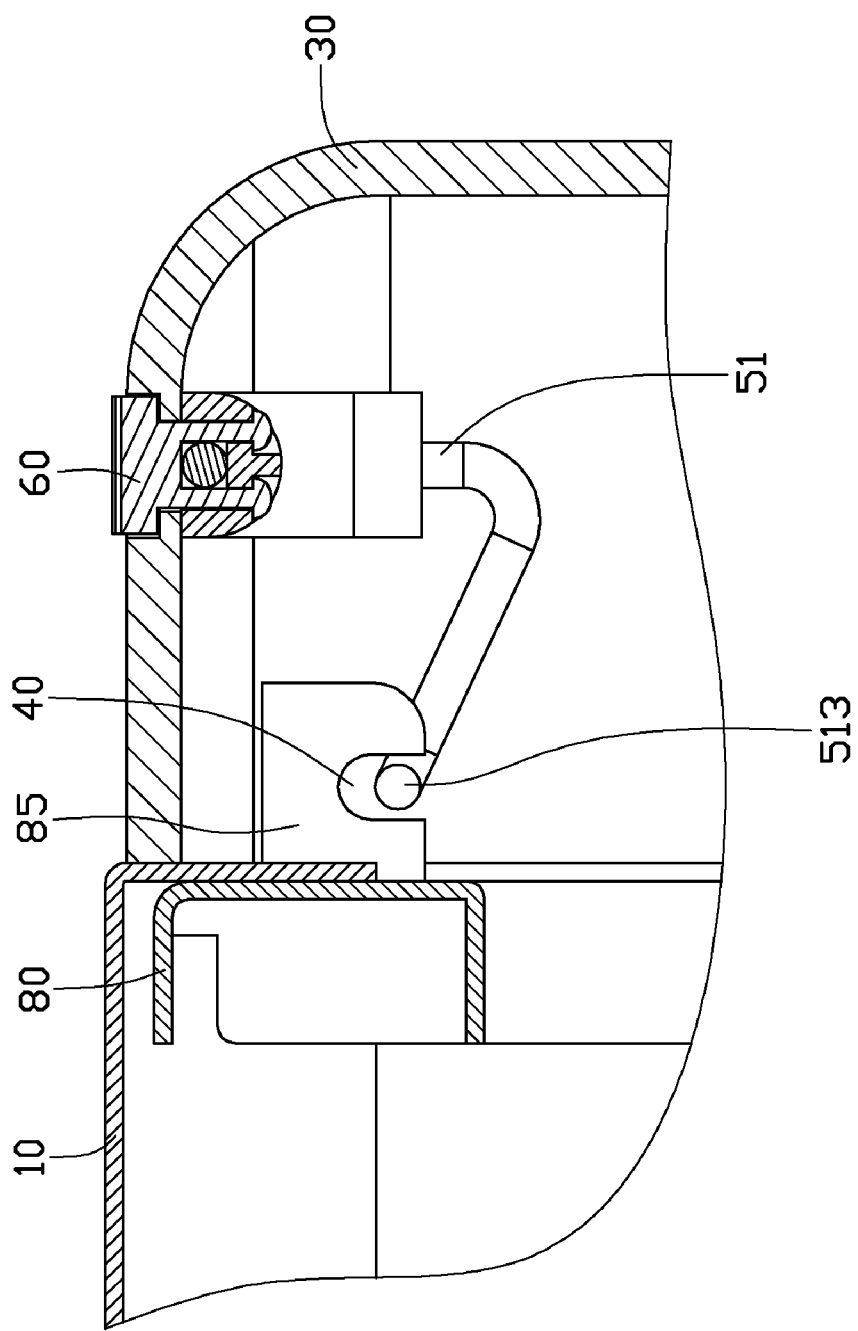
FIG. 7 is a partial, cross-sectional view of the housing of FIG. 1.

Referring to FIGS. 2, 4 and 5, the cover 30 includes a main plate 32 and a side plate 31 extending substantially perpendicularly from an edge of the main plate 32. The side plate 31 defines an assembly hole 33 to receive the sliding control 60 in a top end. The assembly hole 33 is stepped and has a positioning surface 35. Two positioning portions 36 are formed on a top end of the main plate 32, and on opposite sides of the assembly hole 33. Two engaging hooks 38 are formed on a bottom end of the main plate 32. A plurality of positioning members 37 are formed on opposite sides of the main plate 32.

Each fastening assembly 50 includes an engaging member 51, a fixing member 53, and an elastic member 55. The engaging member 51 includes a connecting shaft 511 and two positioning pegs 513 formed on opposite ends of the connecting shaft 511. In the illustrated embodiment, the positioning pegs 513 are substantially L-shaped. The fixing member 53 includes a main portion 536 and a connecting portion 533 extending from an end of the main portion 536. The main portion 536 defines a receiving groove 531 corresponding to the connecting shaft 511, and four fixing holes 532 communicating with the receiving groove 531. The connecting portion 533 defines a fixing hole 535. In the illustrated embodiment, the elastic member 55 is a spring.

The sliding control 60 includes an operating portion 61 and four connecting pegs 63 formed on the operating portion 61. The connecting pegs 63 are arranged in a rectangular manner.

Referring to FIGS. 2 through 7, during assembly of the housing 100, the connecting shaft 511 of the engaging member 51 is fixed in the receiving groove 531 of the fixing member 53 via hot welding. One end of the elastic member 55 is engaged in the fixing hole 535 of the fixing member 53, the other end of the elastic member 55 is connected to the positioning portion 36. The operating portion 61 of the sliding control 60 is positioned in the assembly hole 33 of the cover 30, and resists the positioning surface 35. The connecting pegs 63 extend through the assembly hole 33 into the fixing holes 532 of the fixing member 53. After that, the fastening assembly 50 and the sliding control 60 are positioned on the cover 30, and the fastening assembly 50 is fixed to the sliding control 60. The sliding control 60 is driven to a first end of the assembly hole 33 away from the positioning portion 36 by an external force, and then the elastic member 55 is extended. The cover 30 is positioned on the connecting plate 80 with the positioning members 37 engaging the positioning holes 81, and the engaging hooks 38 engaging the connecting holes 83. When the external force is released, the sliding control 60 is driven to a second end of the assembly hole 33 opposite to the first end by an resilient force of the elastic member 55. Thus, the positioning pegs 513 of the engaging member 51 are received in the restricting grooves 40 of the engaging protrusions 85. Therefore, the cover 30 is firmly fixed to the main body 10.

For detachment of the cover 30 from the main body 10, the sliding control 60 is driven to the first end of the assembly hole 33 again by the external force. At the same time, the positioning pegs 513 of the engaging member 51 disengage from the restricting grooves 40 of the engaging protrusions 85. The cover 30 is easily detached from the main body 10 by the external force applied on an end of the cover 30 adjacent to the sliding control 60.

Since the sliding control 60 is fixedly connected to the fastening assemblies 50, activation thereof changes the fastening assemblies 50 from a locked to unlocked state. After that, the cover 30 is easily detached from the main body 10. In addition, the positioning pegs 513 of the engaging member 51 substantially horizontally disengage from the restricting grooves 40 of the engaging protrusions 85, so that the engaging protrusions 85 apply no force on the positioning pegs 513, dramatically reducing wear thereon.

It should be pointed out that the frame 13 and the connecting plate 80 may be integrally formed. The engaging member 51 may be integrally formed with the sliding control 60. The cover 30 may form one engaging hook 38 or more than two engaging hooks 38, correspondingly, the main body 10 defines one connecting hole 83 or more than two connecting holes 83. In addition, the fixing member 53 may be omitted, and sliding control 60 and the elastic member 55 directly connected to the engaging member 51. The elastic member 55 may be omitted, and the sliding control 60 positioned on the cover 30 via a positioning pin. The engaging member 51 may only include one single positioning peg 513.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A housing for an electronic device, comprising:
   a main body defining at least one restricting groove, wherein the main body forms at least one engaging protrusions positioned inside of the housing, and the at least one restricting groove is defined in the at least one engaging protrusions;
   a cover comprising at least one engaging member; and
   wherein the housing further comprises a sliding control slidably positioned on the cover, and fixed to the at least one engaging member; when the sliding control slides relative to the cover, the at least one engaging member engages the at least one restricting groove of the main body, thus fixing the cover to the main body.

2. The housing of claim 1, wherein the engaging member comprises a connecting shaft and two positioning pegs formed on opposite ends of the connecting shaft.

3. The housing of claim 1, wherein the main body comprises a frame and a connecting plate positioned on a side of the frame, the at least one engaging protrusions is formed on the connecting plate and substantially perpendicular to the connecting plate.

4. The housing of claim 3, wherein the restricting groove is substantially U-shaped.

5. The housing of claim 1, further comprising a fixing member, wherein the sliding control and the engaging member are fixed on the fixing member.

6. The housing of claim 5, wherein the fixing member defines a receiving groove in which a connecting shaft of the engaging member is fixed via hot welding.

7. The housing of claim 5, wherein the sliding control comprises an operating portion and a plurality of connecting pegs formed on the operating portion and the fixing member defines a plurality of fixing holes in which the plurality of connecting pegs are engaged.

8. The housing of claim 7, wherein the cover defines an assembly hole in which the operating portion of the sliding control is slidably received and the plurality of connecting pegs extend through the assembly hole of the cover.

9. The housing of claim 1, wherein a plurality of positioning members are formed on the cover and the main body defines a plurality of positioning holes in which the positioning members are engaged.

10. The housing of claim 1, wherein the at least one engaging member comprises a connecting shaft and two positioning pegs formed on opposite ends of the connecting shaft, and the positioning pegs are substantially L-shaped.

11. A housing for an electronic device, comprising:
    a main body;
    a cover; and
    a connecting mechanism connecting the cover and the main body, the connecting mechanism comprising:
       at least one restricting groove defined in the main body, wherein the main body forms at least one engaging protrusions positioned inside of the housing, and the at least one restricting groove is defined in the at least one engaging protrusions;
       at least one engaging member positioned on the cover and engaging the at least one restricting groove;
       a sliding control slidably positioned on the cover, and fixedly connected to the at least one engaging member; and
       an elastic member positioned between the cover and the engaging member;
    wherein when the sliding control slides relative to the cover along a first direction driven by an external force, the at least one engaging member disengages from the at least one restricting groove of the main body, and the elastic member is extended, and when the external force is released, the at least one engaging member moves in a second direction opposite to the first direction by the resilient force of the elastic member till the at least one engaging member engages in the at least one restricting groove of the main body, thus fixing the cover to the main body.

12. The housing of claim 11, wherein the engaging member comprises a connecting shaft and two positioning pegs formed on opposite ends of the connecting shaft.

13. The housing of claim 11, wherein the main body comprises a frame and a connecting plate positioned on a side of the frame, the at least one engaging protrusions is formed on the connecting plate and substantially perpendicular to the connecting plate.

14. The housing of claim 13, wherein the restricting groove is substantially U-shaped.

15. The housing of claim 11, further comprising a fixing member to which the sliding control and the engaging member are fixed.

16. The housing of claim 15, wherein the fixing member defines a receiving groove in which a connecting shaft of the engaging member is fixed via hot welding.

17. The housing of claim 15, wherein the sliding control comprises an operating portion and a plurality of connecting pegs formed on the operating portion and the fixing member defines a plurality of fixing holes in which the plurality of connecting pegs is engaged.

18. The housing of claim 17, wherein the cover defines an assembly hole in which the operating portion of the sliding control is slidably received, and the plurality of connecting pegs extend through the assembly hole of the cover.

19. The housing of claim 11, wherein a plurality of positioning members is formed on the cover and the main body defines a plurality of positioning holes in which the positioning members are engaged.

20. The housing of claim 11, wherein the at least one engaging member comprises a connecting shaft and two positioning pegs formed on opposite ends of the connecting shaft, and the positioning pegs are substantially L-shaped.

* * * * *